(12) United States Patent
Choi et al.

(10) Patent No.: US 9,946,304 B2
(45) Date of Patent: Apr. 17, 2018

(54) ADJUSTABLE FLEXIBLE DISPLAY DEVICE

(71) Applicant: Samsung Display Co., Ltd., Yongin-Si, Gyeonggi-Do (KR)

(72) Inventors: Byeong Hwa Choi, Seoul (KR); Seung Bae Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 15/713,120

(22) Filed: Sep. 22, 2017

(65) Prior Publication Data

US 2018/0011518 A1    Jan. 11, 2018

Related U.S. Application Data

(62) Division of application No. 15/008,184, filed on Jan. 27, 2016.

(30) Foreign Application Priority Data

Jan. 28, 2015  (KR) ........................ 10-2015-0013810

(51) Int. Cl.
*G06F 1/16* (2006.01)
*H04N 5/64* (2006.01)
*H04N 5/44* (2011.01)

(52) U.S. Cl.
CPC .......... *G06F 1/1652* (2013.01); *G06F 1/1601* (2013.01); *H04N 5/64* (2013.01); *H04N 5/4401* (2013.01)

(58) Field of Classification Search
None
See application file for complete search history.

(56) References Cited

U.S. PATENT DOCUMENTS

| 2007/0278361 | A1 | 12/2007 | May | |
|---|---|---|---|---|
| 2012/0075166 | A1* | 3/2012 | Marti | G06F 3/011 345/1.1 |
| 2014/0055924 | A1 | 2/2014 | Baek et al. | |
| 2014/0099479 | A1* | 4/2014 | Krall | B32B 3/14 428/174 |
| 2015/0092353 | A1* | 4/2015 | Baik | H05K 1/028 361/720 |

FOREIGN PATENT DOCUMENTS

| KR | 10-2006-0008716 A | 1/2006 |
|---|---|---|
| KR | 10-2013-0117110 A | 10/2013 |
| KR | 10-2013-0138614 A | 12/2013 |

* cited by examiner

*Primary Examiner* — Michael Teitelbaum
(74) *Attorney, Agent, or Firm* — Innovation Counsel LLP

(57) ABSTRACT

A flexible display device may include a display module unit configured to project an image, a frame, and a connecting unit. The frame supports the display module unit. The connecting unit is coupled to the display module unit and the frame, and is adjustable so as to allow an amount of curvature of the display module unit to be adjusted.

10 Claims, 17 Drawing Sheets

ADJUSTABLE FLEXIBLE DISPLAY DEVICE

CROSS-REFERENCE TO RELATED APPLICATION

This application is a divisional application of U.S. patent application Ser. No. 15/008,184 filed Jan. 27, 2016, which claims priority to, and the benefit of, Korean Patent Application No. 10-2015-0013810 filed in the Korean Intellectual Property Office on Jan. 28, 2015, the entire contents of which are incorporated herein by reference.

BACKGROUND OF THE INVENTION

(a) Field of the Invention

Embodiments of the present disclosure relate generally to display devices, and more particularly, to adjustable flexible display devices.

(b) Description of the Related Art

A cathode ray tube (CRT), which is one of the display devices that are generally and widely used, is mainly used for TV sets, and monitors for measuring instruments, information terminals, and the like. However, it suffers from the drawbacks of excessive weight and size.

As a solution for the aforementioned problem, flat panel display devices have increasingly displaced CRTs due to their smaller size, lighter weight, and lower power consumption.

Typically, flat panel display devices are classified into either a light-emitting type flat panel display device, or a light-receiving type (non-light-emitting type) flat panel display device. Light-emitting type display devices include organic light emitting display devices (OLEDs), plasma display panels (PDPs), flat cathode ray tubes (FCRTs), vacuum fluorescent display (VFD) panels, light emitting diode (LED) panels, and field emission displays (FEDs). Light-receiving type display devices include liquid crystal display (LCD) panels and the like.

The organic light emitting display device has the advantages of a wide viewing angle, excellent contrast ratio, and high response speed. Accordingly, the organic light emitting display device has found application in mobile devices such as digital cameras, video cameras, camcorders, portable information terminals, smart phones, ultra slim laptop computers, and tablet personal computers, or electronic/electric products such as ultrathin television sets.

Because elements in the organic light emitting display device autonomously emit light, the organic light emitting display device is excellent in visibility even when the organic light emitting display device is in a dark place or in environments where external light enters the organic light emitting display device. Further, the organic light emitting display device exhibits high response speed, which is often an important criterion for evaluating performance of mobile display devices, as they are often required to, for example, display motion pictures.

Recently, research and development efforts have been conducted on a flexible display device, which is portable and can be applied to devices having various shapes, as a next generation display device. Among others, a flexible display device based on an organic light emitting display technology is considered as promising.

Meanwhile, in the flexible display device, a support apparatus is often employed so that a user can conveniently see an image while the flexible display device is unfolded or curved, or so that the user can conveniently carry the flexible display device.

The above information disclosed in this Background section is only for enhancement of understanding the background of the invention and therefore it may contain information that does not form the prior art that is already known in this country to a person of ordinary skill in the art.

SUMMARY

Embodiments of the present invention provide a flexible display device whose degree of curvature may be readily adjusted by the user.

An exemplary embodiment provides a flexible display device including: a display module unit configured to project an image; a frame which supports the display module unit; and a connecting unit which is coupled to the display module unit and the frame, the connecting unit being adjustable so as to allow an amount of curvature of the display module unit to be adjusted.

A rear side of the display module unit may be coupled to the frame.

The rear side of the display module unit is coupled to the frame by, an adhesive, at least one screw, or at least one bolt and at least one nut.

The display module unit may include: a flexible display panel; and a chassis base which is disposed below the flexible display panel, in which the chassis base includes a flexible plate.

The connecting unit may include a tie rod or a variable tie rod.

The variable tie rod may include: a fixing portion; a first variable portion which is movable within the fixing portion; and a second variable portion which is movable within the fixing portion, in which the first variable portion is coupled to the frame, and the second variable portion is coupled to the display module unit.

A rear side of the display module unit may include a detachable unit to which the connecting unit can be removably attached.

The frame may include: a left frame which is connected to the connecting unit and positioned proximate to a left side of the frame; and a right frame which is connected to the connecting unit and positioned proximate to a right side of the frame.

The connecting unit may include: a first coupling unit which is coupled to an upper hole of the left frame; a second coupling unit which is coupled to a lower hole of the left frame; a third coupling unit which is coupled to an upper hole of the right frame; and a fourth coupling unit which is coupled to a lower hole of the right frame.

The display module unit may include: a first detachable unit which is configured to be removably attachable to the first coupling unit and is positioned proximate to an upper right side of the display module unit; a second detachable unit which is configured to be removably attachable to the second coupling unit and is positioned proximate to a lower right side of the display module unit; a third detachable unit which is configured to be removably attachable to the third coupling unit and is positioned proximate to an upper left side of the display module unit; and a fourth detachable unit which is configured to be removably attachable to the fourth coupling unit and is positioned proximate to a lower left side of the display module unit.

The display module unit may include: a flexible display panel; a chassis base which is disposed below the flexible display panel; and a circuit unit which is configured to drive the flexible display device and is disposed between the flexible display panel and the chassis base, in which the chassis base includes chassis base parts which are arranged on a surface of the chassis base along a horizontal direction and connected to each other, and the circuit unit includes circuit parts which are arranged on the surface of the chassis base along the horizontal direction and connected to each other.

The display module unit may further include: a rear cabinet which is disposed below the chassis base, in which the rear cabinet includes rear cabinet parts which are arranged on the surface of the chassis base along the horizontal direction and connected to each other.

According to the flexible display device according to the exemplary embodiment as described above, a screen curvature of the display device may be adjusted by the user.

Therefore, the flexible display device according to embodiments of the present invention may have a relatively small thickness, as a motor and corresponding components are no longer necessary for adjusting device curvature.

In addition, embodiments of the present invention may reduce display cost, as no motor is required. Furthermore, excessive noise due to motor operation is eliminated.

BRIEF DESCRIPTION OF THE DRAWINGS

In order to more sufficiently understand the drawings that are used in the detailed description of the present invention, this brief description of the drawings is provided.

DETAILED DESCRIPTION OF THE EMBODIMENTS

Figure 1:
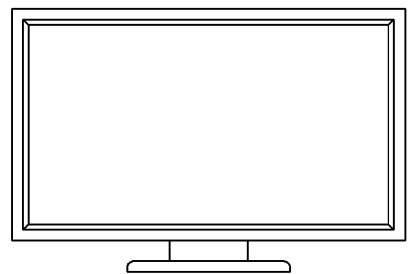
FIG. 1 is a view illustrating an example of a display device.

In order to sufficiently understand the object that will be achieved by the present invention and implementation of the present invention, reference is made to the accompanying drawings for illustrating an exemplary embodiment and contents disclosed in the accompanying drawings.

Hereinafter, an exemplary embodiment will be described in detail with reference to the accompanying drawings. In the description of the present invention, the specific descriptions of publicly known related configurations or functions thereof will be omitted when it is determined that the specific descriptions unnecessarily obscure the subject matter of the present invention. Like reference numerals may refer to the same or corresponding constituent elements illustrated in the respective drawings.

Terms used in the present specification are used only to describe specific exemplary embodiments, and are not intended to limit the present invention. Singular expressions used herein include plurals expressions unless they have definitely opposite meanings in the context. In the present specification, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Throughout this specification and the claims, when one constituent element is referred to as being "directly connected to" another constituent element, one constituent element can be directly connected to the other constituent element, and one constituent element can also be "electrically or mechanically connected to" the other constituent element with other constituent elements therebetween.

All terms used herein including technical or scientific terms have the same meanings as meanings which are generally understood by those skilled in the technical field to which the present invention pertains (those skilled in the art) unless they are differently defined. Terms defined in a generally used dictionary shall be construed that they have meanings matching those in the context of a related art, and shall not be construed in ideal or excessively formal meanings unless they are clearly defined in the present specification.

The various Figures are not to scale. All numerical values are approximate, and may vary. All examples of specific materials and compositions are to be taken as nonlimiting and exemplary only. Other suitable materials and compositions may be used instead.

Figure 2:
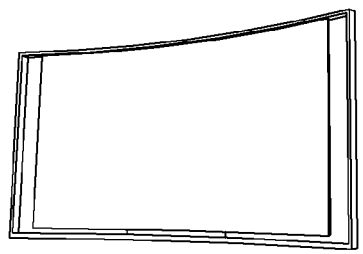
FIG. 2 is a view illustrating another example of the display device.
Figure 3:
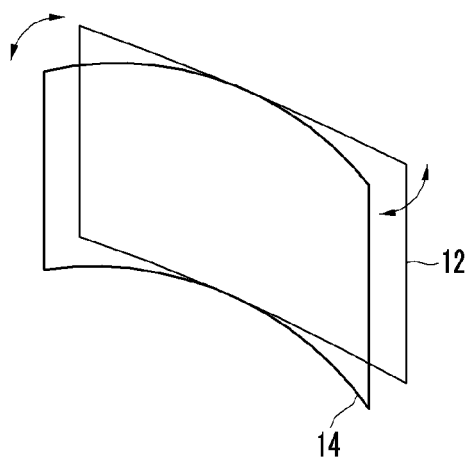
FIG. 3 is a view illustrating yet another example of the display device.

Display devices may be classified as flat panel display devices such as that illustrated in FIG. 1, curved display devices exemplarily illustrated in FIG. 2, in which an angle of a display panel is predetermined, and flexible display devices such as that illustrated in FIG. 3, in which an angle of a display panel may be adjusted.

The flat panel display device is a display device in which a display panel is flat or substantially planar, and the curved display device is a display device in which a display panel has at least one predetermined radius of curvature.

Figure 4:
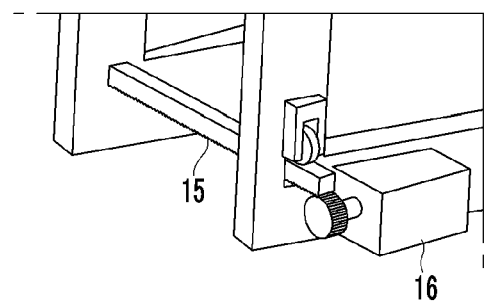
FIG. 4 is a view for explaining a driving unit of the display device illustrated in FIG. 3.

In the flexible display device, a jig (or a rack) 15 illustrated in FIG. 4 is moved by a rear motor 16 illustrated in FIG. 4, such that the angle of the display panel, i.e. its degree of curvature, is adjustable to suit the user. In the flexible display device, the display is automatically changed from a flat display 12 to a curved display 14 by the rear motor 16 that is a driving unit, or automatically changed from a curved display 14 to a flat display 12. FIG. 4 is a view for explaining a driving unit of the display device illustrated in FIG. 3.

In the case of the flexible display device illustrated in FIG. 3, there may be problems in that a thickness of the flexible display device is increased (bulky) due to the motor and accessories for driving the motor, costs required to manufacture the flexible display device are increased due to cost required to purchase components such as the motor, and noise occurs when the motor is operated.

Figure 5:
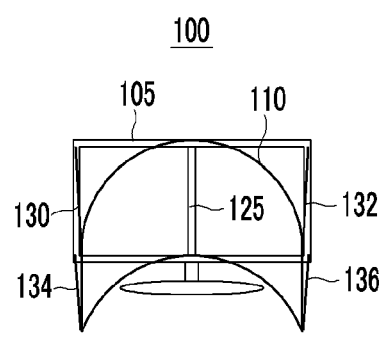
FIG. 5 is a view (perspective view) for explaining a flexible display device according to an exemplary embodiment of the present invention.

FIG. 5 is a view (perspective view) for explaining a flexible display device according to an exemplary embodiment of the present invention.

Referring to FIG. 5, a flexible display device 100 is a variable curved display that is manually operated by a user, and may include a display module unit 110, a frame (or an apparatus frame) 105, and at least one connecting unit (or a curvature adjusting unit) 130, 132, 134, or 136.

As an example, the flexible display device 100 may be an organic light emitting diode (OLED) display device employing an OLED panel.

As one example, the frame 105 may have a rectangular shape, and may support the display module unit 110. A lower portion of a coupling frame 125 included in the frame 105 may be connected to a stand of the display device 100. The frame 105 may be manufactured (implemented) in a plate or flat/planar shape, although any shape and configuration are contemplated.

Any one or more of connecting units 130, 132, 134, or 136 may be present, and may be coupled (connected) to the display module unit 110 and the frame 105, and may allow a curvature of the display module unit 110 to be manually adjusted (or changed). As illustrated in FIG. 3 or 5, each connecting unit 130, 132, 134, or 136 may be attached to a corner of display module unit 110 to displace its corner so as to manually alter the degree of curvature of the unit 110 to any desired level. The connecting unit 130, 132, 134, or 136 may form the curvature of the display module unit 110 by forming a distance between the frame 105 and the display module unit 110. The display module unit 110 may be curved forward from the flexible display device 100.

Figure 6:
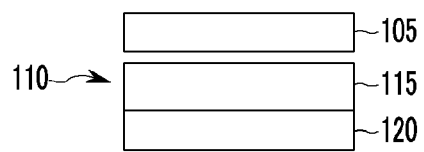
FIG. 6 is a top plan view of the flexible display device illustrated in FIG. 5.

As illustrated in FIG. 6, the display module unit 110 may include a flexible display panel 120, and a chassis base 115 that is disposed (installed) below the flexible display panel 120.

A portion at a rear side of the display module unit 110 (e.g., a central portion (not illustrated) corresponding to the coupling frame 125) may be coupled (or fixedly coupled) to the coupling frame 125 included in the frame 105. For example, as illustrated in FIG. 5, the coupling frame 125 may be formed (disposed) at a center (horizontal center) of the frame 105. When the portion at the rear side of the display module unit 110 is coupled to the coupling frame 125 of the frame 105, an adhesive, screws, or nuts and bolts may be used. The chassis base 115 may include an iron plate. For example, the iron plate may be a high tension steel plate that is excellent in elastic force (or restoring force), and may have a relatively small thickness so as to be flexible, i.e. able to be bent or curved by the connecting units 130, 132, 134, 136.

Each connecting unit 130, 132, 134, or 136 may include a tie rod (or a support rod) or a variable tie rod (or a length-variable tie rod).

The display module unit 110 may include, at the rear side thereof, a detachable unit (or a detachable member) which attaches and detaches the connecting unit 130, 132, 134, or 136 from the display module unit 110.

Figure 7:
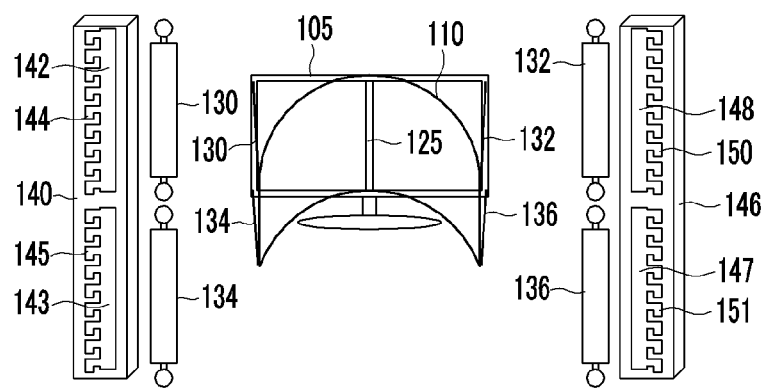
FIG. 7 is a view illustrating an exemplary embodiment of the flexible display device illustrated in FIG. 5.

FIG. 7 is a view for explaining a detailed configuration (a detailed structure) of the flexible display device illustrated in FIG. 5. The left- and right-side portions of FIG. 7 are expanded magnified views of the left and right sides of frame 105, respectively.

Referring to FIG. 7, the frame 105 includes a left frame 140 and a right frame 146. As illustrated in FIG. 7, the left frame 140 and the right frame 146 may be connected to an upper frame and a lower frame of the frame 105.

The left frame 140 may be (mechanically) connected to the connecting units 130 and 134, and may be formed (disposed) at the left side of the frame 105. The right frame 146 may be connected to the connecting units 132 and 136, and may be formed (disposed) at the right side of the frame 105.

The connecting units 130, 132, 134, and 136 may include a first coupling unit 130, a second coupling unit 134, a third coupling unit 132, and a fourth coupling unit 136.

One end (tip) of the first coupling unit 130 may be rested in or affixed to one of the upper holes (or upper resting holes) 144 formed in the left frame 140. The upper holes 144 may be connected to a first frame groove (or a first frame hole) 142 which is formed in the left frame 140 and into which the one end of the first coupling unit 130 may be inserted. The other end of the first coupling unit 130 may be fixed at an upper right side (or an upper right edge) of the display module unit 110 (when viewed from the rear of unit 110).

One end of the second coupling unit 134 may be rested in one of the lower holes (lower resting holes) 145 of the left frame 140. The lower holes 145 may be connected to a second frame groove 143 into which the one end of the second coupling unit 134 may be inserted. The other end of the second coupling unit 134 may be fixed at a lower right side of the display module unit 110 (when viewed from the rear of unit 110).

One end of the third coupling unit 132 may be rested in one of the upper holes (upper resting holes) 150 of the right frame 146. The upper holes 150 may be connected to a third frame groove 148 into which the one end of the third coupling unit 132 may be inserted. The other end of the third coupling unit 132 may be fixed at an upper left side of the display module unit 110 (when viewed from the rear of unit 110).

The fourth coupling unit 136 may be rested in one of the lower holes (lower resting holes) 151 of the right frame 146. The lower holes 151 may be connected to a fourth frame groove 147 into which one end of the fourth coupling unit 136 may be inserted. The other end of the fourth coupling unit 136 may be fixed at a lower left side of the display module unit 110 (when viewed from the rear of unit 110).

Figure 8:
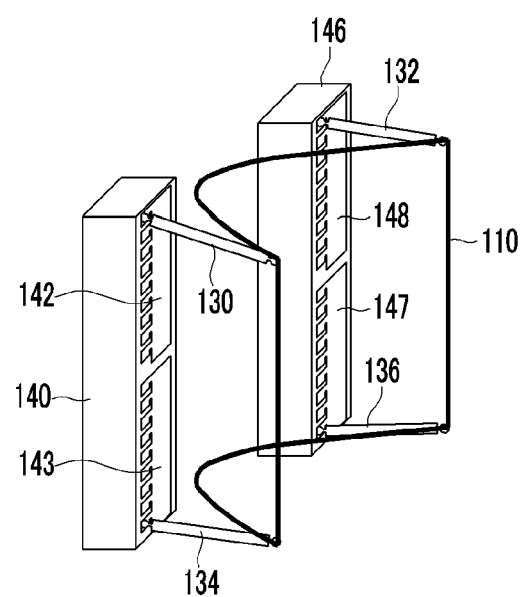
FIG. 8 is a view for explaining the exemplary embodiment of the flexible display device illustrated in FIG. 7.

FIG. 8 is a view for explaining the exemplary embodiment of the flexible display device illustrated in FIG. 7.

Referring to FIG. 8, when the curvature of the display module unit 110 is large (or the radius of curvature is small), the one end of each of the connecting units 130, 132, 134, and 136 of the flexible display device is fixed to the frame 105, and the other end of each of the connecting units 130, 132, 134, and 136 is fixed to the display module unit 110, thereby maintaining shapes of the connecting units 130, 132, 134, and 136. In another exemplary embodiment of the present invention, unlike the exemplary embodiment illustrated in FIG. 8, the right frame 146 illustrated in FIG. 8 may be disposed so that the third frame groove 148 is directed toward the left frame 140 (i.e. is closer to left frame 140 than the holes 150, 151.

Figure 9:
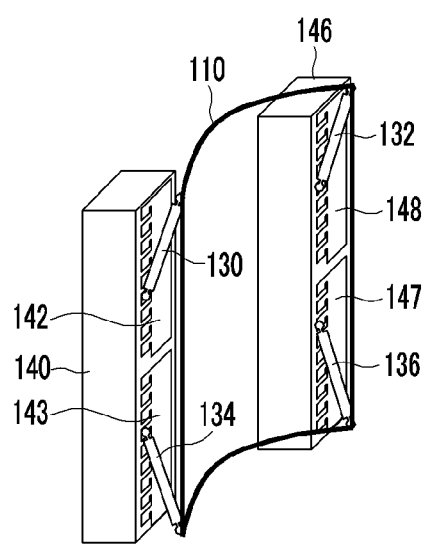
FIG. 9 is a view for explaining another exemplary embodiment of the flexible display device illustrated in FIG. 7.

FIG. 9 is a view for explaining another exemplary embodiment of the flexible display device illustrated in FIG. 7.

Referring to FIG. 9, when the curvature of the display module unit 110 is small (or the radius of curvature is large), the one end of each of the connecting units 130, 132, 134, and 136 of the flexible display device is fixed to the frame 105, and the other end of each of the connecting units 130, 132, 134, and 136 is fixed to the display module unit 110, thereby maintaining the shapes of the connecting units 130, 132, 134, and 136. In another exemplary embodiment of the present invention, unlike the exemplary embodiment illustrated in FIG. 9, the right frame 146 illustrated in FIG. 9 may be disposed so that the third frame groove 148 is directed toward the left frame 140 (i.e. is closer to left frame 140 than the holes 150, 151.

Referring back to FIGS. 8 and 9, when the curvature is large and when the curvature is small, a position of the one end of each of the connecting units 130, 132, 134, and 136, which are rested on the left frame 140 and the right frame 146, may be changed. The user may adjust angles of the connecting units 130, 132, 134, and 136 (angles formed by the left frame (or the right frame) and the connecting units), and as a result, the curvature of the flexible display device (or the display module unit) illustrated in FIG. 7 may be adjusted. Therefore, the user may adjust the curvature of the flexible display device to any amount desired, by using an apparatus of the present invention.

Figure 10:
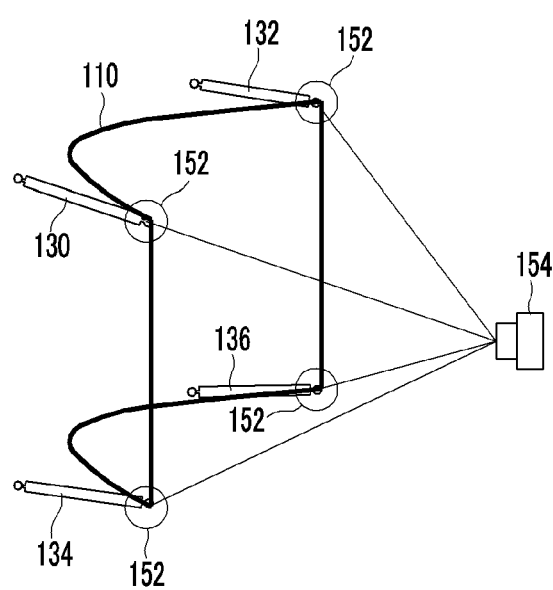
FIG. 10 is a view for explaining a detachable unit of a display module unit, which connects a display module unit and a connecting unit illustrated in FIG. 5.

FIG. 10 is a view for explaining a detachable unit of a display module unit, which connects a display module unit and a connecting unit illustrated in FIG. 5.

Referring to FIG. 10, the display module unit 110 includes a first through fourth detachable units 154. The first detachable unit 154 may attach and detach the connecting unit 130, that is, the first coupling unit, and may be formed (disposed) at the rear upper right side of the display module unit 110, as indicated by reference numeral 152.

The second detachable unit 154 may attach and detach the connecting unit 134, that is, the second coupling unit, and may be formed (disposed) at the rear lower right side of the display module unit 110, as indicated by reference numeral 152.

The third detachable unit 154 may attach and detach the connecting unit 132, that is, the third coupling unit, and may be formed (disposed) at the rear upper left side of the display module unit 110, as indicated by reference numeral 152.

The fourth detachable unit 154 may attach and detach the connecting unit 136, that is, the fourth coupling unit, and may be formed (disposed) at the rear lower left side of the display module unit 110, as indicated by reference numeral 152.

The connecting units 130, 132, 134, and 136 may be inserted into the first to fourth detachable units 154, or may be separated from the interior of the first to fourth detachable units 154.

Figure 11:
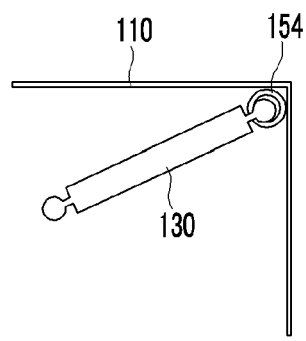
FIG. 11 is a rear view of the display module unit, which illustrates the detachable unit illustrated in FIG. 10.

FIG. 11 is a rear view of the display module unit, which illustrates further details of the detachable unit illustrated in FIG. 10. Referring to FIG. 11, the connecting unit 130 may be attached to, and detached from, the detachable unit 154 formed at the rear upper right side (upper right edge) of the display module unit 110.

Figure 12:
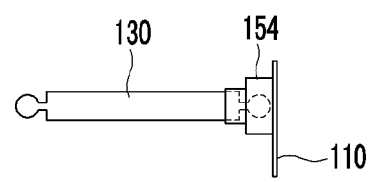
FIG. 12 is a side view (left side view) of the flexible display device, which explains a state in which the connecting unit is attached to the detachable unit illustrated in FIG. 10.

FIG. 12 is a side view (left side view) of the flexible display device, which explains a state in which the connecting unit is attached to the detachable unit illustrated in FIG. 10. Referring to FIG. 12, for example, users may attach one end (e.g., a spherical or ball-shaped end) of the connecting unit 130 to a cylindrical detachable unit 154 having a spherical groove.

Figure 13:
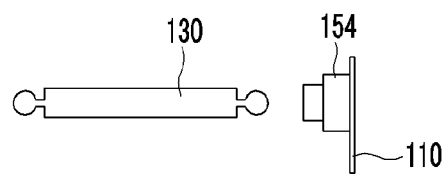
FIG. 13 is a side view (left side view) of the flexible display device, which explains a state in which the connecting unit is detached from the detachable unit illustrated in FIG. 10.

FIG. 13 is a side view (left side view) of the flexible display device, which explains a state in which the connecting unit is detached from the detachable unit illustrated in FIG. 10. Referring to FIG. 13, for example, users may detach the ball-shaped end of the connecting unit 130 from the spherical groove of cylindrical detachable unit 154.

The unit 154 and end of connecting unit 130 may take on any shape or configuration that allows for attachment to, and detachment from, each other. That is, connecting unit 130 and display module unit 110 may be made removably affixable to each other by any mechanism or means by which two objects can be removably attached to each other.

Figure 14:
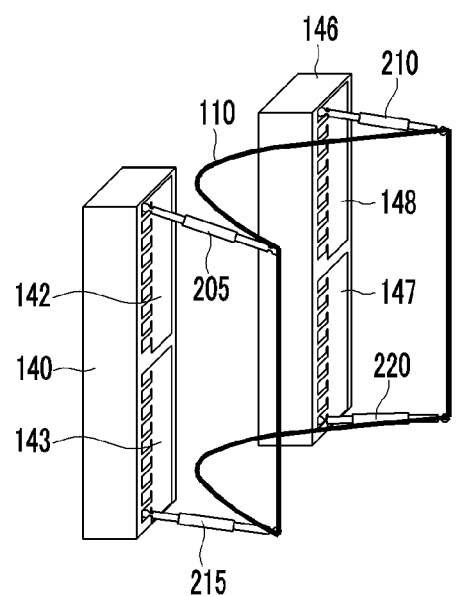
FIG. 14 is a view (perspective view) for explaining a flexible display device according to another exemplary embodiment of the present invention.

FIG. 14 is a view (perspective view) for explaining a configuration of a flexible display device according to another exemplary embodiment of the present invention.

Referring to FIG. 14, the flexible display device may include constituent elements identical to the constituent elements of the flexible display device of FIG. 7, except for the aforementioned connecting units 130, 132, 134, and 136 of the flexible display device illustrated in FIG. 7.

The flexible display device of FIG. 14 may include constituent elements of the flexible display device of FIG. 7, along with connecting units 205, 210, 215, and 220. The connecting units 205, 210, 215, and 220 may each be a variable tie rod.

Figure 15:
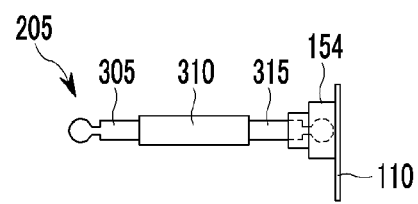
FIG. 15 is a side view (left side view) of the flexible display device, which explains an exemplary embodiment of the connecting unit illustrated in FIG. 14.

FIG. 15 is a side view (left side view) of the flexible display device, which explains an exemplary embodiment of the connecting unit illustrated in FIG. 14. Referring to FIG. 15, the variable tie rod 205 may include a fixing portion (or a central portion) 310, a first variable portion 305, and a second variable portion 315. A length of the structure of the variable tie rod 205 may be changed by the user, and as a result, the curvature of the flexible display device (or the display module unit) of FIG. 14 may be manually adjusted. Therefore, the user may adjust the curvature of the flexible display device as desired, by using the apparatus of the present invention.

Figure 16:
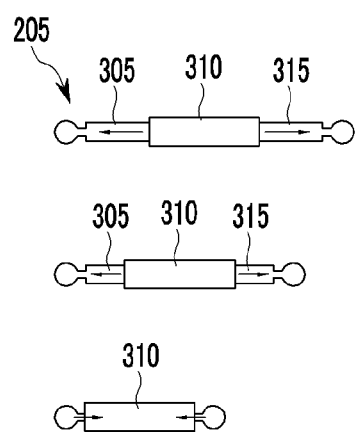
FIG. 16 is a view for explaining the exemplary embodiment of the connecting unit illustrated in FIG. 15.

As illustrated in FIG. 16, the first variable portion 305 may be moved (or may slide) within the fixing portion 310 (in an internal groove of the fixing portion 310). As illustrated in FIG. 16, the second variable portion 315 may also be slidably moved within the fixing portion 310 (or may enter and exit the interior of the fixing portion 310). The first variable portion 305 may be coupled to the frame 105, and the second variable portion 315 may be coupled to the display module unit 110. Embodiments of the invention contemplate use of any slidably adjustable mechanism for portions 305, 310, 315, whether manually adjustable, powered/automatic, or otherwise.

Figure 17:
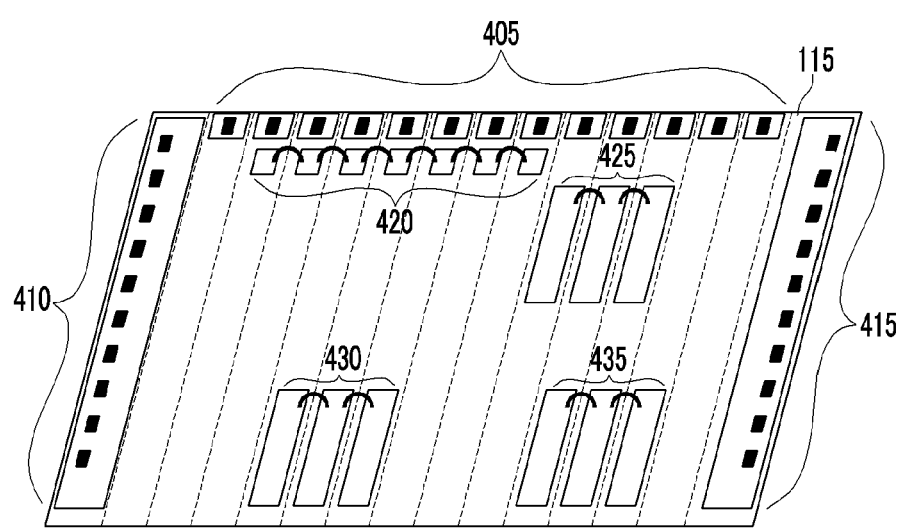
FIG. 17 is a view for explaining an exemplary embodiment of the display module unit illustrated in FIG. 5 or 14.

FIG. 17 is a view for explaining an exemplary embodiment of the display module unit illustrated in FIG. 5 or 14.

Referring to FIGS. 17 and 5, the display module unit (110 in FIG. 5) may further include circuit units 405, 410, 415, 420, 425, 430, and 435, and a rear cabinet (not illustrated) that is a case or enclosure for the flexible display device.

The circuit units 405, 410, 415, 420, 425, 430, and 435 may drive the flexible display device 100 (or the flexible display panel 120 that outputs (displays) an image), and may be disposed (installed) between the flexible display panel 120 and the chassis base 115.

As indicated by dotted lines in FIG. 17, the chassis base 115 may include chassis base parts (or unit chassis bases) which are arranged on a plane or surface of the chassis base 115 in a horizontal direction (Y-axis direction) and connected to each other. For example, each of the chassis base parts may have a quadrangular shape.

The circuit units 405, 410, 415, 420, 425, 430, and 435 may include circuit parts (or unit circuit units) which are arranged on the plane of the chassis base 115 in the horizontal direction (Y-axis direction) and connected to each other. For example, each of the circuit parts may have a quadrangular shape.

As one example, the circuit unit may include a source driver integrated circuit (IC) 405, a first gate driver integrated circuit (IC) 410, a second gate driver integrated circuit (IC) 415, a source PCB 420 which is a data printed circuit board that includes a transmission signal line, a logic board 425 which may receive an image signal from an image board 435 and produce a control signal required to drive the flexible display panel, a switching mode power supply (SMPS) board 430 which is a power supply board that generates DC power from an AC input power source, and the image board 435 which outputs an image signal to the flexible display panel (or the source driver IC 405).

The rear cabinet may be disposed (formed) below the chassis base 115. The rear cabinet may include rear cabinet parts (or unit rear cabinets) which are arranged on the plane of the chassis base 115 in or along the horizontal direction (Y-axis direction) and connected to each other. For example, each of the rear cabinet parts may have a quadrangular shape. In another exemplary embodiment of the present invention, the circuit units 405, 410, 415, 420, 425, 430, and 435 may be disposed (installed) between the chassis base 115 and the rear cabinet.

The aforementioned structures of the chassis base 115, the circuit unit 405, 410, 415, 420, 425, 430, and 435, and the rear cabinet may also form an articulated structure (or joint structure). All of the chassis base 115, the circuit units 405, 410, 415, 420, 425, 430, and 435, and the rear cabinet may be configured to be partially articulated, and as a result, the curvature of the flexible display device may be naturally formed.

As described above, the exemplary embodiments have been disclosed in the drawings and the specification. Here, although specific terms have been used, the terms are used for the purpose of merely describing the present invention, not limiting the meaning or the scope which is included in the appended claims. Thus, it will be understood by those skilled in the art that numerous variations and equivalent exemplary embodiments may be made from the present invention. Accordingly, the true technical protection scope should be determined by the technical spirit of the appended claims. Furthermore, different features of the various embodiments, disclosed or otherwise understood, can be mixed and matched in any manner to produce further embodiments within the scope of the invention.

DESCRIPTION OF SYMBOLS

105: Frame
110: Display module unit
115: Chassis base
120: Flexible display panel
125: Coupling frame
130: First coupling unit
134: Second coupling unit
132: Third coupling unit
136: Fourth coupling unit
154: Detachable unit

What is claimed is:

1. A flexible display device comprising:
   a display module unit configured to project an image;
   a frame supporting the display module unit; and
   a connecting unit coupled to the display module unit and the frame, the connecting unit being adjustable so as to allow an amount of curvature of the display module unit to be adjusted,
   wherein the frame includes a groove and a plurality of holes connected to the groove, and
   wherein one end of the connecting unit is inserted into the groove and rested in one of the holes.

2. The flexible display device of claim 1, wherein:
   a rear side of the display module unit is coupled to the frame.

3. The flexible display device of claim 2, wherein:
   the rear side of the display module unit is coupled to the frame by an adhesive, at least one screw, or at least one bolt and at least one nut.

4. The flexible display device of claim 1, wherein the display module unit includes:
   a flexible display panel; and
   a chassis base which is disposed below the flexible display panel,
   wherein the chassis base includes a flexible plate.

5. The flexible display device of claim 1, wherein:
   a rear side of the display module unit includes a detachable unit to which the connecting unit can be removably attached.

6. The flexible display device of claim 1, wherein the frame includes:
   a left frame connected to the connecting unit and positioned proximate to a left side of the frame; and
   a right frame connected to the connecting unit and positioned proximate to a right side of the frame.

7. The flexible display device of claim 6, wherein the connecting unit includes:
   a first coupling unit coupled to an upper hole of the left frame;
   a second coupling unit coupled to a lower hole of the left frame;
   a third coupling unit coupled to an upper hole of the right frame; and
   a fourth coupling unit coupled to a lower hole of the right frame.

8. The flexible display device of claim 7, wherein the display module unit includes:
   a first detachable unit configured to be removably attachable to the first coupling unit and positioned proximate to an upper right side of the display module unit;
   a second detachable unit configured to be removably attachable to the second coupling unit and positioned proximate to a lower right side of the display module unit;
   a third detachable unit configured to be removably attachable to the third coupling unit and positioned proximate to an upper left side of the display module unit; and
   a fourth detachable unit configured to be removably attachable to the fourth coupling unit and positioned proximate to a lower left side of the display module unit.

9. The flexible display device of claim 1, wherein the display module unit includes:
a flexible display panel;
a chassis base disposed below the flexible display panel; and
a circuit unit configured to drive the flexible display device and disposed between the flexible display panel and the chassis base,
wherein the chassis base includes chassis base parts which are arranged on a surface of the chassis base along a horizontal direction and connected to each other, and
the circuit unit includes circuit parts which are arranged on the surface of the chassis base along the horizontal direction and connected to each other.

10. The flexible display device of claim 9, wherein the display module unit further includes:
a rear cabinet disposed below the chassis base,
wherein the rear cabinet includes rear cabinet parts which are arranged on the surface of the chassis base along the horizontal direction and connected to each other.

* * * * *